United States Patent [19]

Kuroda et al.

[11] Patent Number: 5,132,189

[45] Date of Patent: Jul. 21, 1992

[54] PHOTOCONDUCTOR FOR ELECTROPHOTOGRAPHY

[75] Inventors: Masami Kuroda; Masayo Amano; Noboru Furusho, all of Kawasaki, Japan

[73] Assignee: Fuji Electric Co., Ltd., Kawasaki, Japan

[21] Appl. No.: 577,106

[22] Filed: Sep. 4, 1990

[30] Foreign Application Priority Data

Sep. 7, 1989 [JP] Japan ................................. 1-232315
Jan. 8, 1990 [JP] Japan ................................. 2-1431
Mar. 26, 1990 [JP] Japan ................................. 2-76212

[51] Int. Cl.$^5$ .............................................. G03G 5/06
[52] U.S. Cl. ..................................... 430/58; 430/73; 430/76; 430/77
[58] Field of Search ................. 430/73, 74, 75, 76, 430/77, 58

[56] References Cited

U.S. PATENT DOCUMENTS

| | | | |
|---|---|---|---|
| 3,189,447 | 6/1965 | Neugebauer et al. | 96/1 |
| 3,484,237 | 12/1969 | Shattuck et al. | 96/1.5 |
| 3,816,118 | 7/1974 | Byrne | 96/1.5 |
| 4,150,987 | 4/1979 | Anderson et al. | 96/1.5 R |
| 4,278,747 | 7/1981 | Murayama et al. | 430/82 |
| 4,353,971 | 10/1982 | Chang et al. | 430/58 |
| 4,367,273 | 1/1983 | Murayama et al. | 430/56 |
| 4,385,106 | 5/1983 | Sakai | 420/59 |
| 4,415,640 | 11/1983 | Goto et al. | 430/59 |
| 4,448,868 | 5/1984 | Suzuki et al. | 430/58 |
| 4,565,761 | 1/1986 | Katagiri et al. | 430/83 |
| 4,568,623 | 2/1986 | Makino et al. | 430/58 |
| 4,606,986 | 8/1986 | Yanus et al. | 430/59 |
| 4,624,904 | 11/1986 | Kazmaier et al. | 430/59 |
| 4,629,670 | 12/1986 | Katagiri et al. | 430/58 |
| 4,629,672 | 12/1986 | Makino et al. | 430/76 |
| 4,666,809 | 5/1987 | Matsumoto et al. | 430/76 |
| 4,673,630 | 6/1987 | Katagiri et al. | 430/72 |
| 4,677,045 | 6/1987 | Champ et al. | 430/76 |
| 4,702,983 | 10/1987 | Haino et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/75 |
| 4,839,252 | 6/1989 | Murata et al. | 430/59 |
| 4,861,691 | 8/1989 | Kuroda et al. | 430/59 |
| 4,861,692 | 8/1989 | Kuroda et al. | 430/59 |
| 4,865,934 | 9/1989 | Ueda et al. | 430/59 |
| 4,871,636 | 10/1989 | Hattori et al. | 430/77 |
| 4,877,703 | 10/1989 | Kuroda et al. | 430/76 |
| 4,882,255 | 11/1989 | Hattori et al. | 430/73 |
| 4,910,110 | 3/1990 | Kuroda et al. | 430/59 |
| 4,929,525 | 5/1990 | Kuroda et al. | 430/75 |
| 4,935,323 | 6/1990 | Hattori et al. | 430/58 |
| 4,945,021 | 7/1990 | Takata et al. | 430/76 |
| 4,948,689 | 8/1990 | Kuroda et al. | 430/59 |
| 4,950,572 | 8/1990 | Kuroda et al. | 430/59 |
| 4,954,405 | 9/1990 | Sugata et al. | 430/58 |
| 4,956,250 | 9/1990 | Kuroda et al. | 430/58 |
| 4,956,255 | 9/1990 | Ueda | 430/76 |
| 4,956,277 | 9/1990 | Kuroda et al. | 430/58 |
| 4,957,837 | 9/1990 | Kuroda et al. | 430/59 |
| 4,971,876 | 11/1990 | Kuroda et al. | 430/75 |
| 4,985,325 | 1/1991 | Kuroda et al. | 430/59 |
| 4,988,594 | 1/1991 | Hattori et al. | 430/59 |

FOREIGN PATENT DOCUMENTS 0034942 9/1981 European Pat. Off. .

(List continued on next page.)

Primary Examiner—John Goodrow
Attorney, Agent, or Firm—Spencer, Frank & Schneider

[57] ABSTRACT

A photoconductor for electrophotography includes an electroconductive substrate and a photosensitive layer formed on the substrate. The photosensitive layer includes a novel azo compound as a charge generating substance therein. One example of the azo compound is represented by general formula:

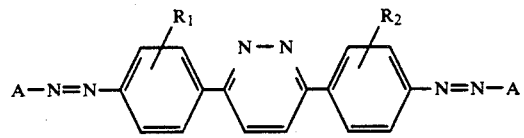

wherein A stands for a coupler residue, and each of $R_1$ and $R_2$ is one of a hydrogen atom, a halogen atom, an alkyl group and an alkoxy group.

7 Claims, 1 Drawing Sheet

FOREIGN PATENT DOCUMENTS

| | | |
|---|---|---|
| 0131140 | 1/1985 | European Pat. Off. . |
| 0270685 | 6/1988 | European Pat. Off. . |
| 1058836 | 6/1959 | Fed. Rep. of Germany . |
| 1105714 | 4/1961 | Fed. Rep. of Germany . |
| 1908343 | 8/1969 | Fed. Rep. of Germany . |
| 1921273 | 11/1969 | Fed. Rep. of Germany . |
| 2041490 | 3/1971 | Fed. Rep. of Germany . |
| 2046914 | 4/1971 | Fed. Rep. of Germany . |
| 2110971 | 12/1971 | Fed. Rep. of Germany . |
| 2357851 | 6/1974 | Fed. Rep. of Germany . |
| 2944949 | 6/1980 | Fed. Rep. of Germany . |
| 3019909 | 11/1980 | Fed. Rep. of Germany . |
| 3022545 | 1/1981 | Fed. Rep. of Germany . |
| 3138292 | 5/1982 | Fed. Rep. of Germany . |
| 3141306 | 6/1982 | Fed. Rep. of Germany . |
| 3139524 | 8/1982 | Fed. Rep. of Germany . |
| 3203621 | 9/1982 | Fed. Rep. of Germany . |
| 3208337 | 9/1982 | Fed. Rep. of Germany . |
| 3303830 | 8/1983 | Fed. Rep. of Germany . |
| 3320674 | 12/1983 | Fed. Rep. of Germany . |
| 3602987 | 10/1986 | Fed. Rep. of Germany . |
| 3643341 | 6/1987 | Fed. Rep. of Germany . |
| 3841207 | 6/1989 | Fed. Rep. of Germany . |
| 3842253 | 6/1989 | Fed. Rep. of Germany . |
| 10785 | 5/1972 | Japan . |
| 37543 | 12/1972 | Japan . |
| 66444 | 9/1973 | Japan . |
| 39952 | 4/1975 | Japan . |
| 150128 | 11/1979 | Japan . |
| 42380 | 10/1980 | Japan . |
| 116039 | 9/1981 | Japan . |
| 101844 | 6/1982 | Japan . |
| 176055 | 10/1982 | Japan . |
| 32327 | 2/1983 | Japan . |
| 198043 | 11/1983 | Japan . |
| 2023 | 1/1984 | Japan . |
| 50445 | 3/1984 | Japan . |
| 133553 | 7/1984 | Japan . |
| 182456 | 10/1984 | Japan . |
| 182457 | 10/1984 | Japan . |
| 204840 | 11/1984 | Japan . |
| 5941 | 2/1985 | Japan . |
| 93443 | 5/1985 | Japan . |
| 45664 | 10/1985 | Japan . |
| 60052 | 12/1985 | Japan . |
| 29496 | 7/1986 | Japan . |
| 262052 | 11/1987 | Japan . |
| 264055 | 11/1987 | Japan . |

PHOTOCONDUCTOR FOR ELECTROPHOTOGRAPHY

BACKGROUND OF THE INVENTION

1. Field of the Invention

The present invention relates to photoconductors for electrophotography, and particularly to a photoconductor for electrophotography which contains a novel charge generating substance in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and bisazo compounds, dispersions of such organic photoconductive substances in resin binder, and a sputtered film of such organic photoconductive substances.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light. In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of organic materials have recently been put into practical use by virtue of the advantageous features of flexibility, thermal stability, and/or a film forming capacity.

Many photoconductors having a photoconductive organic dye of pigment with an excellent charge generation ability have been proposed. They include a photoconductor comprising phthalocyanine as a charge generating substance (disclosed in U.S. Pat. No. 3,816,118), squarylium as a charge generating substance (disclosed in Japanese Patent Application Publication No. 29,496/1986), azulenium as a charge generating substance (disclosed in Laid Open Japanese Patent Application No. 133,553/1984) and anthanthrone as a charge generating substance (disclosed in Japanese Patent No. 60052/1985).

A number of photoconductors using a novel azo compounds as a charge generating substance (disclosed in Laid Open Japanese Patent Application Nos. 37,543/1972, 116,039/1981, and 176,055/1982, and Japanese Patent Application Publication No. 5,941/1985, and Japanese Patent Application Publication No. 45,664/1985) have also been known. As to a charge transporting substance a lot of novel hydrazone compounds, pyrazoline compounds and the like have been proposed.

Although organic materials have many advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention, which has been made in view of the foregoing, is to provide a photoconductor for electrophotography for use in copying apparatuses and printers which photoconductor includes a novel organic materials not used to date as a charge generating substance in the photosensitive layer, and has a high photosensitivity and excellent characteristics in repeated use.

According to the present invention, there is provided photoconductors for electrophotography which comprises:

an electroconductive substrate; and a photosensitive layer formed on the substrate and including at least one azo compound represented by one of the following general formulae (I) to (V) as a charge generating substance:

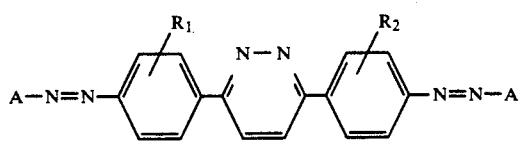
(I)

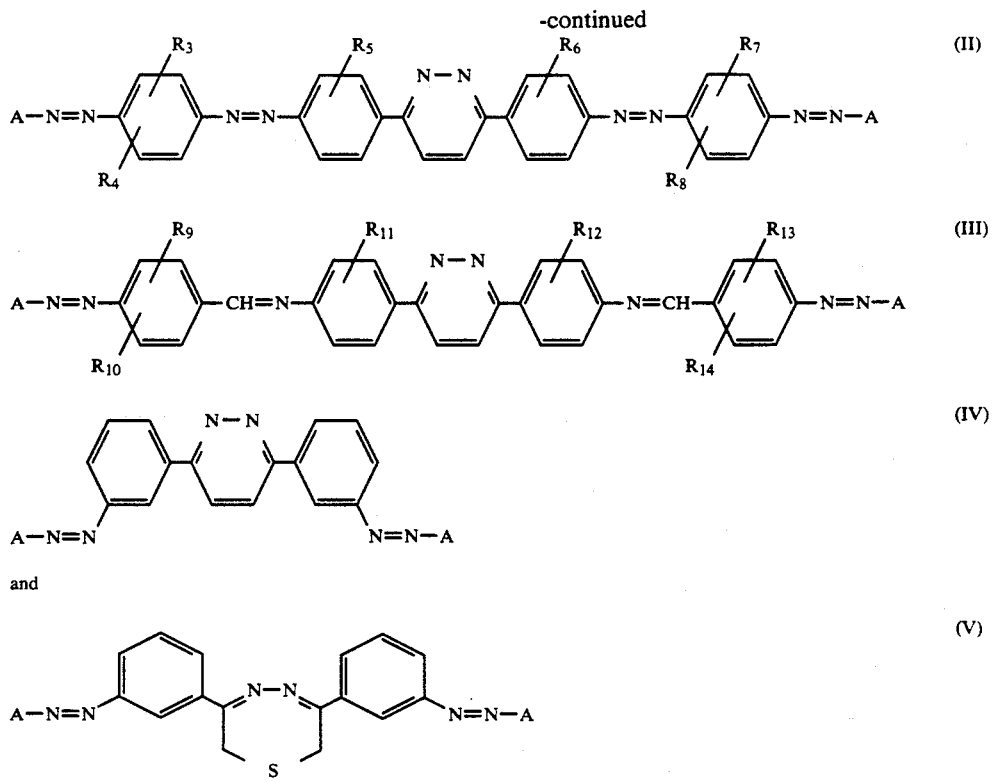

and

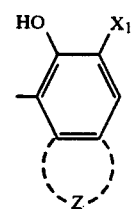

wherein A in the formulae (I) to (V) is a coupler residual group, wach of $R_1$ and $R_2$ in the formula (I), $R_5$ and $R_6$ in the formula (II) and $R_{11}$ and $R_{12}$ in the formula (III) is selected from the group consisting of a hydrogen atom, a halogen atom, an alkyl group and an alkoxy group, each of which groups may be or not may be substituted, each of $R_3$, $R_4$, $R_7$ and $R_8$ in the formula (II) and $R_9$, $R_{10}$, $R_{13}$ and $R_{14}$ in the formula (III) is selected from the group consisting of a hydrogen atom, a halogen atom, a nitro group and the following groups, which may be or not may be substituted, an alkyl group and an alkoxy group.

Here, the coupler residual group A may be selected from the group consisting of structures represented by one of the following general formulae (VI) to (XII):

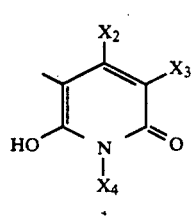

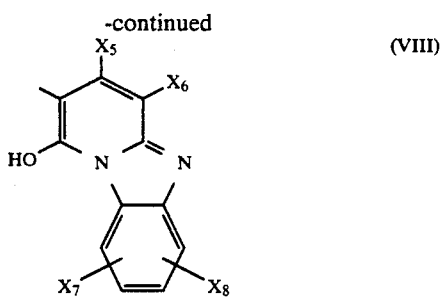

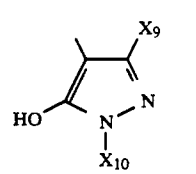

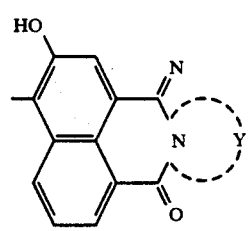

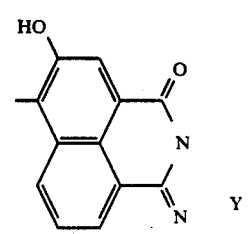

-continued
and

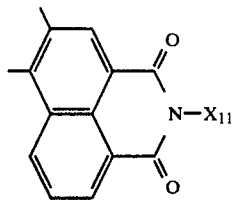

(XII)

wherein Z is a residual group which condenses with a benzene ring to form an aromatic polycycle or heterocycle, $X_1$ is selected from the group consisting of a halogen atom, $COOR_{15}$ and $CONR_{16}R_{17}$ (each of $R_{15}$, $R_{16}$ and $R_{17}$ is selected from the group consisting of a hydrogen atom, an alkyl group, an aryl group and a heterocyclic group, wach of which groups may be or not may be substituted), each of $X_2$ and $X_5$ is selected from the group consisting of an alkyl group, an aryl group and a heterocyclic group, each of which groups may be or not may be substituted, each of $X_3$ and $X_6$ is selected from the group consisting of a hydrogen atom, a cyano group, a carbamoyl group, a carboxyl group, an ester group and an acyl group, each of $X_4$ and $X_{11}$ is selected from the group consisting of a hydrogen atom, an alkyl group, a cycloalkyl group, an alkenyl group, an aralkyl group, an aryl group and a heterocyclic group, each of which groups may be or not may be substituted, each of $X_7$ and $X_8$ is selected from the group consisting of a hydrogen atom, a halogen atom, a nitro group, and the following groups, which may be or may not be substituted, an alkyl group and an alkoxy group, $X_9$ is selected from the group consisting of an alkyl group, an aryl group, a carboxyl group and an ester group, each of which groups may be or not may be substituted, $X_{10}$ is one of an aryl group and a heterocyclic group, each of which groups may be or not may be substituted and Y is a residual group which forms a heterocyclic group.

The photosensitive layer may comprise a layer including dispersion of a charge generating substance selected from azo compounds represented by the general formulae (I) to (V) and a charge transporting substance.

The photosensitive layer may comprise a laminate of a charge transporting layer mainly composed of a charge transporting substance and a charge generating layer including a compound selected from azo compounds represented by the general formulae (I) to (V).

DETAILED DESCRIPTION OF PREFERRED EMBODIMENTS

Figure 1:
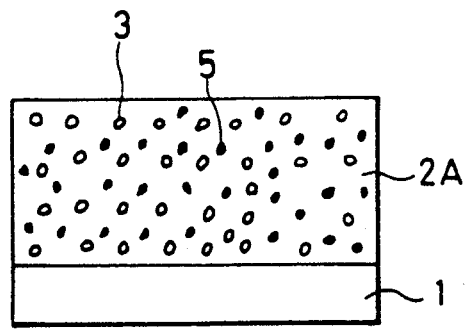
FIGS. 1 to 3 are schematic cross-sectional views of photoconductors according to the present invention.
Figure 2:
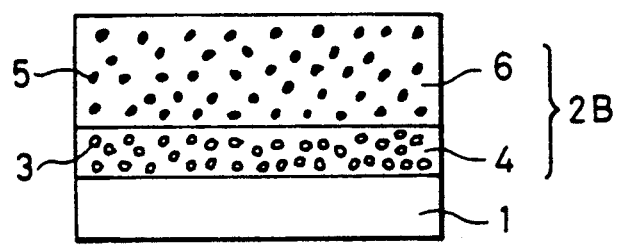
Figure 3:
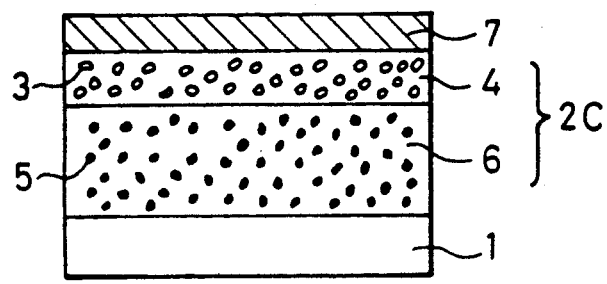

The photoconductor of the present invention, which contains the specific azo compound as a charge generating substance in the photosensitive layer thereof, may have any one of the structures as shown in FIGS. 1, 2 and 3 according to the manner of application thereto of the azo compound. The specific azo compounds to be used in the present invention are explained later.

FIGS. 1, 2 and 3 are schematic cross-sectional views of different embodiments of the photoconductor of the present invention, respectively.

FIG. 1 shows a cross-sectional view of a monolayer type photoconductor. A photosensitive layer 2A is provided on an electroconductive substrate 1. The photosensitive layer 2A comprises the above-mentioned azo compound as a charge generating substance 3, and a charge transporting substance 5 both of which substances are dispersed in a resin binder matrix so that the photosensitive layer 2A functions as a photoconductor.

FIG. 2 shows a laminate type photoconductor. A laminated photosensitive layer 2B is provided on an electroconductive substrate 1, a lower layer of the laminate is a charge generating layer 4 including the above-mentioned azo compound as a charge generating substance 3 and an upper one is a charge transporting layer 6 containing a charge transporting substance 5 as a main component, so that the photosensitive layer 2B functions as a photoconductor. A covering layer (not shown) may be provided on the charge transporting layer 6. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including the above-mentioned azo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, two kinds of layer structure are provided for laminate type photoconductors. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 for the present.

A photoconductor as shown in FIG. 1 can be produced by dispersing a charge generating substance in a solution of a charge transporting substance and a resin binder and applying the resulting dispersion on an electroconductive substrate and then drying the resulting coating film.

A photoconductor as shown in FIG. 2 can be prepared by applying and drying a dispersion of a particulate charge generating substance in a solvent and/or a resin binder on an electroconductive substrate, followed by applying a solution of a charge transporting substance and a resin binder on the resulting layer and drying.

A photoconductor as shwon in FIG. 3 can be prepared by applying and drying a solution of a charge transporting substance and a resin binder onto an electroconductive substrate, and coating and drying dispersion of a particulate charge generating substance in a solvent and/or a resin binder onto the resulting coating layer, followed by formation of a covering layer.

The electroconductive substrate 1 serves as an electrode of the photoconductor and as a support for a layer or layers formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a specific novel azo compound as a charge generating substance 3 in a resin binder, and this layer generates an electric charge upon receiving light. It is important that the charge generating layer 4 be high not only in charge generating efficiency but also in capability of injecting the generated electric charge into the charge transporting layer 6 and any converging layer 7, which capability is desirably as little dependent upon the electric field as possible and high even in low intensity electric fields. It also is possible to form a charge generating layer using a charge generating substance as a main component in mixture with a charge transporting substance and so on. Resin binders usable in the charge generating layer include polycarbonates, polyesters, polyamides, polyurethanes, polyvinyl chloride, epoxy resins, silicone resins, diallyl phthalate resins, butyral resines and homopolymers and copolymers of methacrylate esters, which may be used either alone or in appropriate combination.

The ratio of the azo compound to the resine binder is within a range from 30-90 weight %. Dichloromethane, dichloroethane, ethyl acetate, methylethyl ketone, tetrahydrofuran and the like may be used as a dispersing medium.

The charge transporting layer 6, which is formed by application of a solution or dispersion of a hydrazone compound, a pyrazoline compound, a stilbene compound, a triphenyl-amine compound, an oxazole compound or an oxadiazole compound as an organic charge transporting substance in a resin binder, exhibits a function of serving as an insulating layer in the dark to retain an electric charge of the photoconductor as well as a function transporting an electric charge injected from the charge generating layer upon receiving light. Resin binders usable in the charge transporting layer include polycarbonates, polyesters, and homopolymers and copolymers of methacrylate esters and so on.

The covering layer 7 has a function of receiving and retaining an electric charge generated by corona discharge in the dark and a capability of transmitting light to which the charge generating layer should respond. It is necessary that the covering layer 7 transmits light upon exposure of the photoconductor and allows the light to reach the charge generating layer, and then undergoes the injection of an electric charge generated in the charge generating layer to neutralize and erases a surface electric charge. Materials usable in the covering layer include organic insulating film-forming materials such as polyesters and polyamides. Such organic materials may also be used in mixture with an inorganic material such as an inorganic polymer resin or $SiO_2$, or an electric resistance-lowering material such as a metal-alkoxy compound, metal or a metallic oxide with film-forming capability. Materials usable in the covering layer are not limited to organic insulating film-forming materials, and further include inorganic materials such as $SiO_2$, metals, and metallic oxides, which may be formed on a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

Now, the azo compounds to be used as a charge generating substance in the present invention will be explained. The first kind of the specific azo compounds is represented by the following general formula (I):

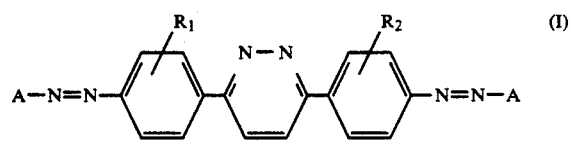

wherein, A is a coupler residual group and each of $R_1$ and $R_2$ is selected from the group consisting of a hydrogen atom, a halogen atom, an alkyl group and an alkoxy group each of which groups may be or not may be substituted. The coupler residual group A is preferably selected from the group consisting of structures represented by the following general formulae (VI) to (XII):

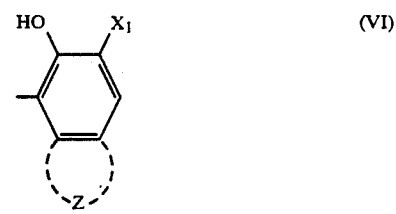

(VI)

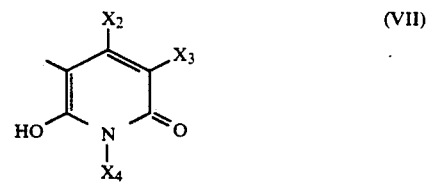

(VII)

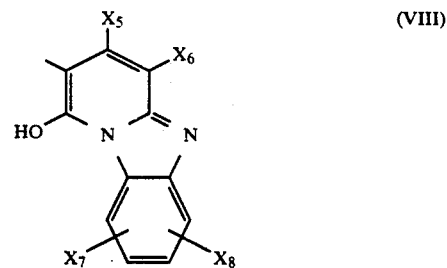

(VIII)

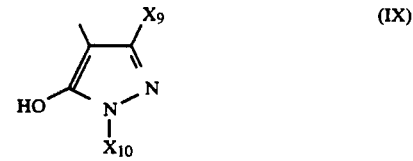

(IX)

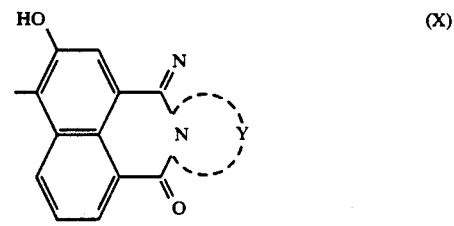

(X)

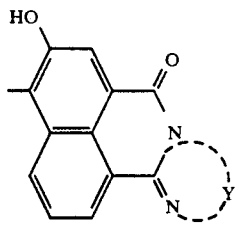 (XI)

and

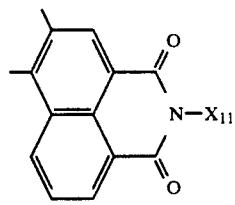 (XII)

wherein Z is a residual group which condenses with a benzene ring to form an aromatic polycycle or heterocycle, $X_1$ is selected from the group consisting of a hydrogen atom, $COOR_{15}$ and $CONR_{16}R_{17}$ (each of $R_{15}$, $R_{16}$ and $R_{17}$ is selected from the group consisting of a hydrogen atom, an alkyl group, an aryl group and a heterocyclic group, each of which groups may be or not may be substituted), each of $X_2$ and $X_5$ is selected from the group consisting of an alkyl group, an aryl group and a heterocyclic group, each of which groups may be or not may be substituted, each of $X_3$ and $X_6$ is selected from the group consisting of a hydrogen atom, a cyano group, a carbamoyl group, a carboxyl group, an ester group and an acyl group, each of $X_4$ and $X_{11}$ is selected from the group consisting of a hydrogen atom, an alkyl group, a cycloalkyl group, an alkenyl group, an aralkyl group, an aryl group and a heterocyclic group, each of which groups may be or not may be substituted, each of $X_7$ and $X_8$ is selected from the group consisting of a hydrogen atom, a halogen atom, a nitro group and the following groups, which may be or not may be substituted, an alkyl group and an alkoxy group, $X_9$ is selected from the group consisting of an alkyl group, an aryl group, a carboxyl group and an ester group, each of which groups may be or not may be substituted, $X_{10}$ is one of an aryl group and a heterocyclic group, which groups may be or not may be substituted and Y is a residual group which forms a herterocyclic group.

Azo compounds, represented by the foregoing general formula (I) can be synthesized by tetrazotizing an amino compound represented by the following general formula (1) with a conventional method and coupling reacting the resultant azo compound with a corresponding coupler in an appropriate solvent (for example, N,N-dimethylformamide, dimethyl sulfoxide and so on) under the presence of a base.

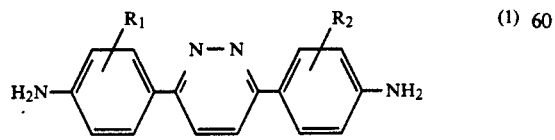 (1)

$R_1$ and $R_2$ were explained before.

Specific examples of the azo compounds of the general formula (I) prepared in the above-mentioned manner include compounds as shown in Tables A, B, C, and D.

TABLE A

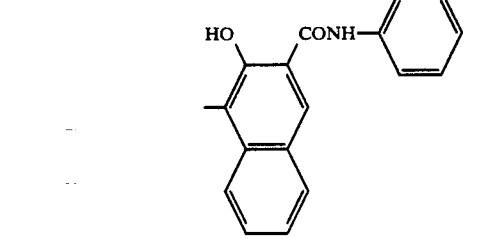

| COMPOUND No. | A |
|---|---|
| I-1 | 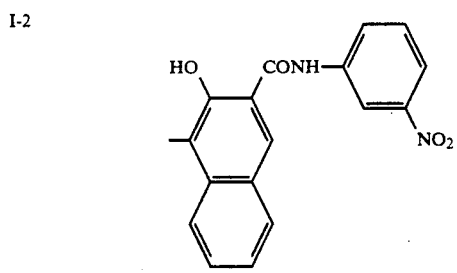 |
| I-2 | 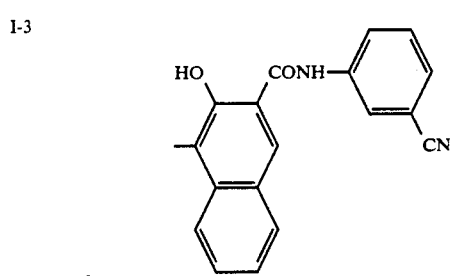 |
| I-3 | 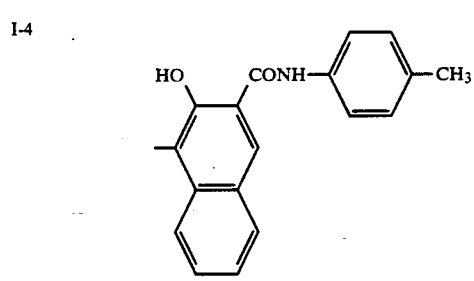 |
| I-4 | 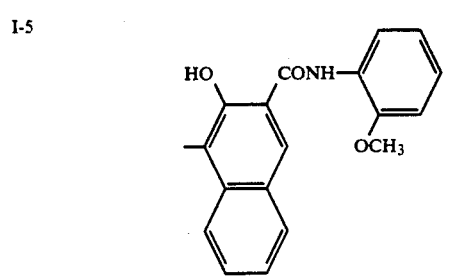 |
| I-5 | |

TABLE A-continued
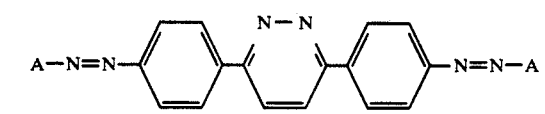
| COMPOUND No. | A |
|---|---|
| I-6 | 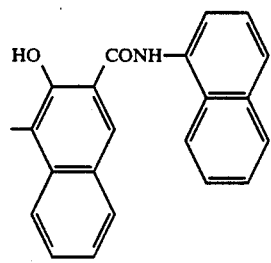 |
| I-7 | 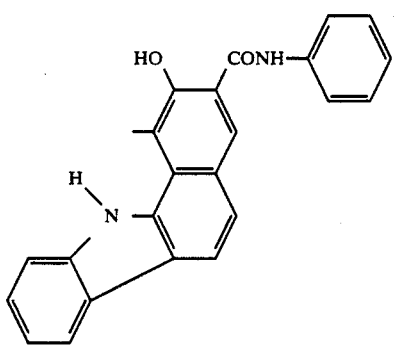 |
| I-8 | 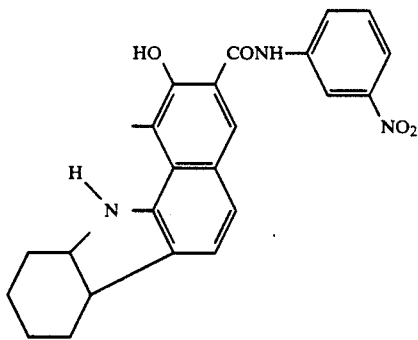 |
| I-9 | 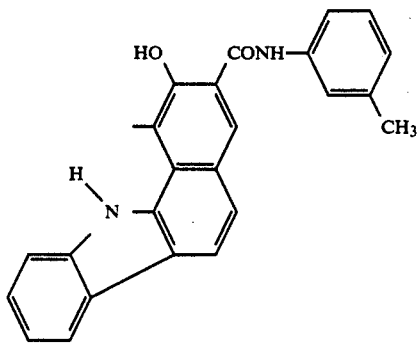 |
TABLE A-continued
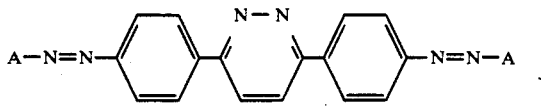
| COMPOUND No. | A |
|---|---|
| I-10 | 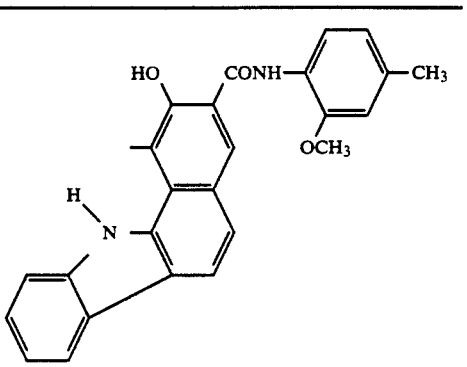 |
| I-11 | 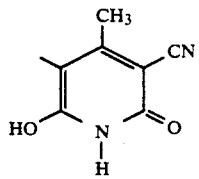 |
| I-12 | 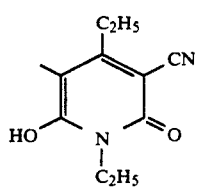 |
| I-13 | 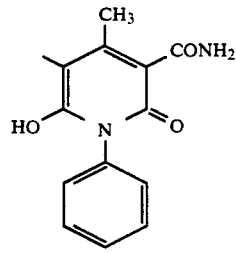 |
| I-14 | 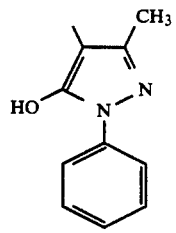 |
| I-15 | 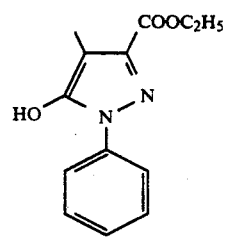 |

TABLE A-continued
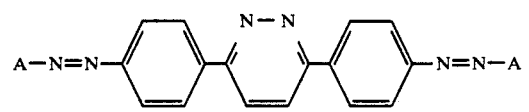
| COMPOUND No. | A |
|---|---|
| I-16 | 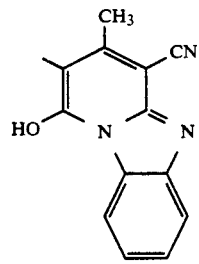 |
| I-17 | 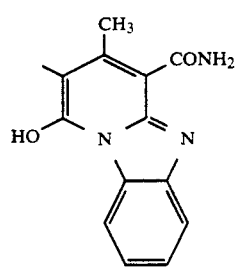 |
| I-18 | 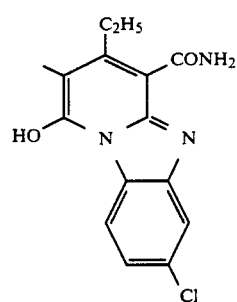 |
| I-19 | 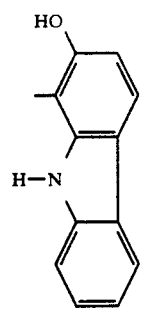 |
| I-20 | 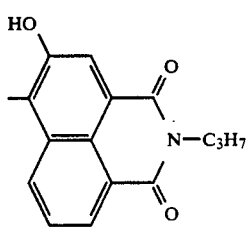 |
TABLE A-continued
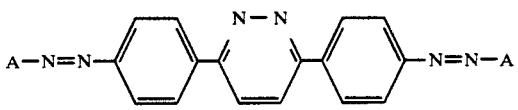
| COMPOUND No. | A |
|---|---|
| I-21 | 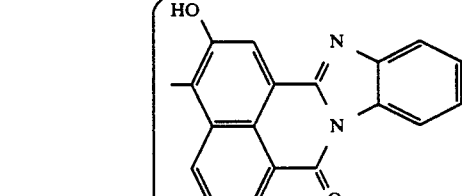 OR 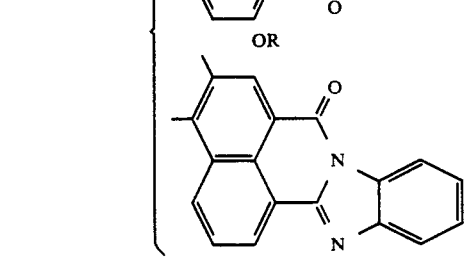 |
TABLE B
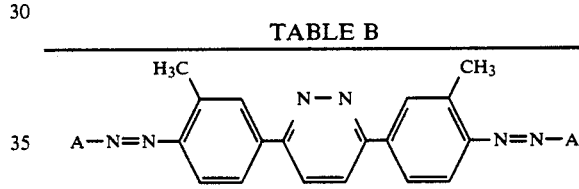
| COMPOUND No. | A |
|---|---|
| I-22 | 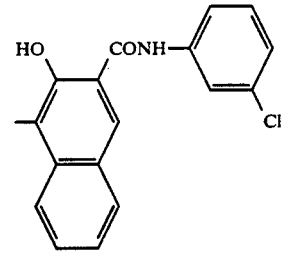 |
| I-23 | 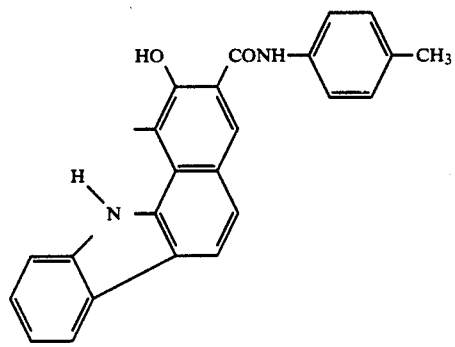 |

TABLE B-continued

[Structure: A—N=N—(phenyl with 3-CH₃)—CH=CH—(phenyl with 3-CH₃)—N=N—A]

| COMPOUND No. | A |
|---|---|
| I-24 | 4-C₂H₅, 5-CH₃, 3-CN, 6-HO, 1-C₃H₇, 2-oxo pyridone |
| I-25 | 3-C₂H₅, 4-CH₃, 5-HO, 1-phenyl pyrazole |

TABLE C

[Structure: A—N=N—(phenyl with 3-OCH₃)—CH=CH—(phenyl with 3-OCH₃)—N=N—A]

| COMPOUND No. | A |
|---|---|
| I-26 | 3-HO, 4-methyl, N-(3-bromophenyl) naphthamide |
| I-27 | 3-HO, CONH-(2-methoxyphenyl), with fused NH-(2-methylphenyl) benzo group |

TABLE C-continued

[Structure: A—N=N—(phenyl with 3-OCH₃)—CH=CH—(phenyl with 3-OCH₃)—N=N—A]

| COMPOUND No. | A |
|---|---|
| I-28 | 4-CH₃, 5-CH₃, 3-CONH₂, 6-HO, 1-CH₃, 2-oxo pyridone |
| I-29 | 4-CH₃, 3-COOC₂H₅, 5-HO, 1-(4-methylphenyl) pyrazole |

TABLE D

[Structure: A—N=N—(phenyl with 3-Cl)—CH=CH—(phenyl with 3-Cl)—N=N—A]

| COMPOUND No. | A |
|---|---|
| I-30 | 3-HO, CONH-(4-methyl-2-methoxyphenyl), methyl naphthamide |
| I-31 | 3-HO, CONH-(3-bromophenyl), with fused NH-(2-methylphenyl) benzo group |

TABLE D-continued

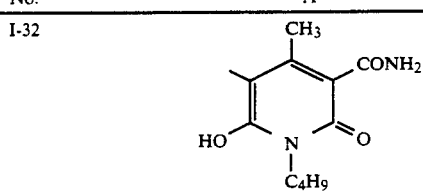

| COMPOUND No. | A |
|---|---|
| I-32 |  |
| I-33 | 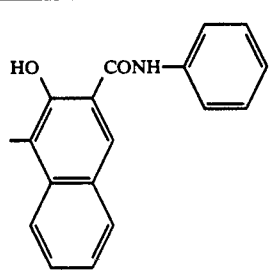 |

The second kind of the specific azo compounds to be used as a charge generating substance in the present invention is represented by the following general formula (II):

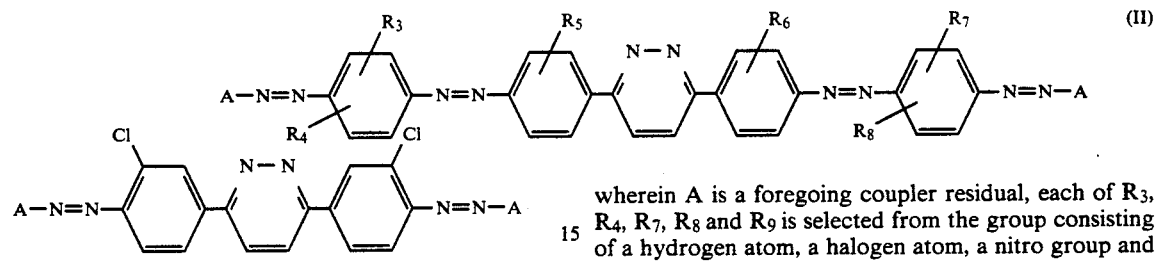

wherein A is a foregoing coupler residual, each of $R_3$, $R_4$, $R_7$, $R_8$ and $R_9$ is selected from the group consisting of a hydrogen atom, a halogen atom, a nitro group and the following groups, which may be or not may substituted, an alkyl group and an alkoxy group, each of $R_5$ and $R_6$ is selected from the group consisting of a hydrogen atom, a halogen atom, an alkyl group and an alkoxy group, each of which groups may be or not may be substituted.

Azo compounds, represented by the foregoing general formula (II) can be synthesized by tetrazotizing an amino compound represented by the following general formula (2) with a conventional method and coupling reacting the resultant azo compound with a corresponding coupler in an appropriate solvent (for example, N,N-dimethylformamide, dimethyl sulfoxide and so on) under the presence of a base.

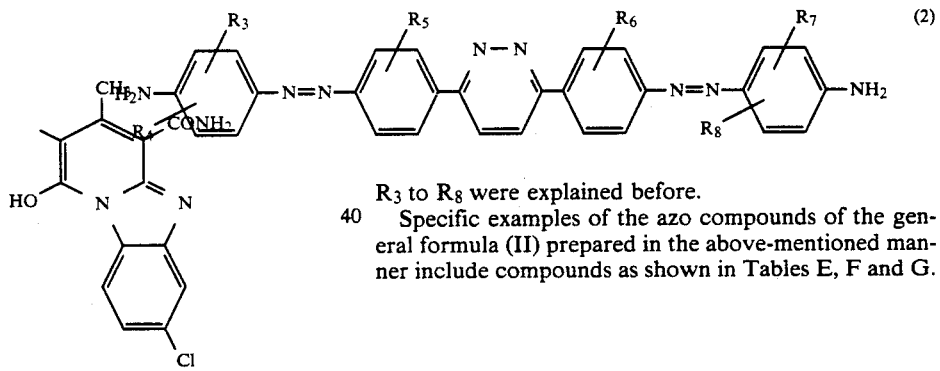

$R_3$ to $R_8$ were explained before.

Specific examples of the azo compounds of the general formula (II) prepared in the above-mentioned manner include compounds as shown in Tables E, F and G.

TABLE E

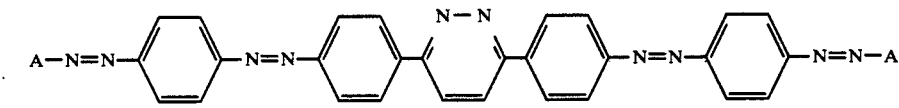

| COMPOUND No. | A | COMPOUND No. | A |
|---|---|---|---|
| II-1 | 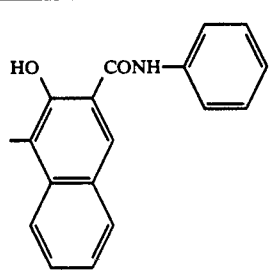 | II-2 | 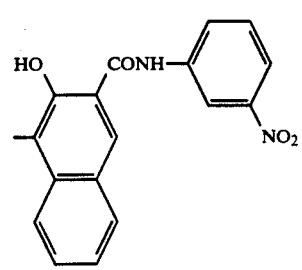 |

TABLE E-continued

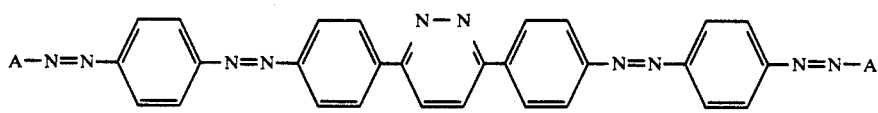

| COMPOUND No. | A | COMPOUND No. | A |
|---|---|---|---|
| II-3 | 3-hydroxy-4-methyl-N-(3-bromophenyl)-2-naphthamide | II-4 | 3-hydroxy-4-methyl-N-(4-methoxyphenyl)-2-naphthamide |
| II-5 | 3-hydroxy-4-methyl-8-(2-methylphenylamino)-N-phenyl-2-naphthamide | II-6 | 3-hydroxy-4-methyl-8-(2-methylphenylamino)-N-(3-cyanophenyl)-2-naphthamide |
| II-7 | 3-cyano-6-hydroxy-4,5-dimethyl-2-pyridone | II-8 | 3-cyano-6-hydroxy-4,5-dimethyl-1-phenyl-2-pyridone |
| II-9 | 3-cyano-6-hydroxy-1,4,5-trimethyl-2-pyridone | II-10 | 3-cyano-6-hydroxy-4,5-dimethyl-1-($C_4H_7$)-2-pyridone |
| II-11 | 5-hydroxy-3,4-dimethyl-1-phenylpyrazole | II-12 | 5-hydroxy-3,4-dimethyl-1-(4-methylphenyl)pyrazole |

TABLE E-continued
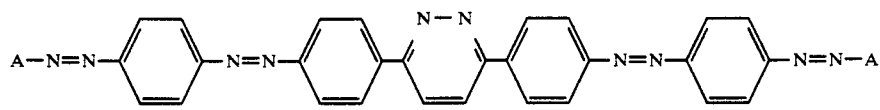
| COMPOUND No. | A | COMPOUND No. | A |
|---|---|---|---|
| II-13 | | II-14 | |
| II-15 | | II-16 | |
| II-17 | | II-18 | |
| II-19 | | II-20 | |

TABLE E-continued
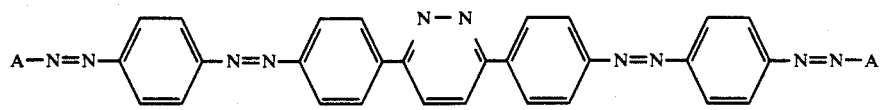
| COMPOUND No. | A | COMPOUND No. | A |
|---|---|---|---|
| II-21 | 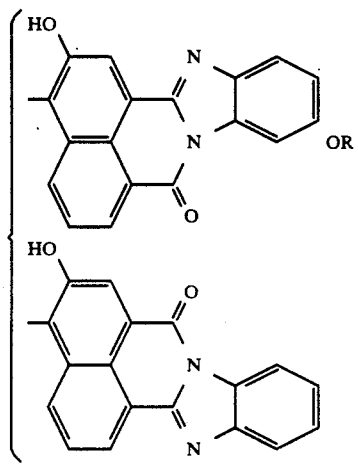 OR | | |
TABLE F
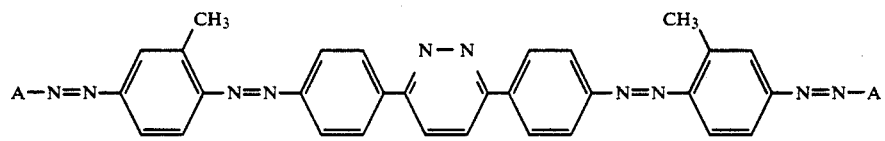
| COMPOUND No. | A | COMPOUND No. | A |
|---|---|---|---|
| II-22 | 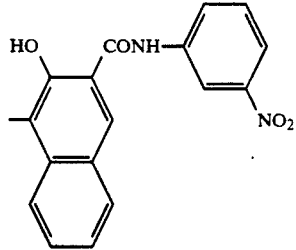 | II-23 | 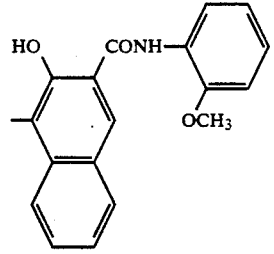 |
| II-24 | 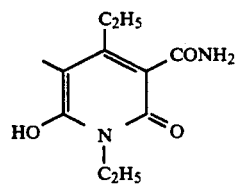 | II-25 | 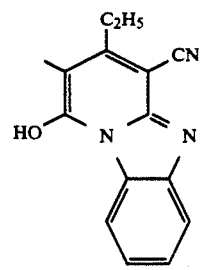 |

TABLE G

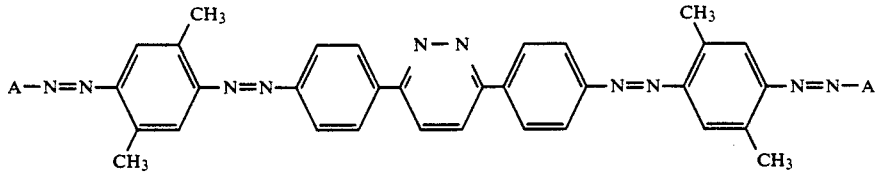

| COMPOUND No. | A | COMPOUND No. | A |
|---|---|---|---|
| II-26 | 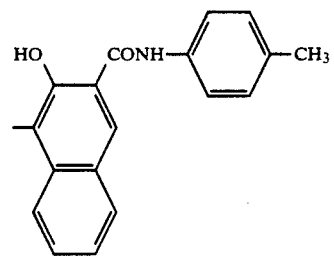 | II-27 | 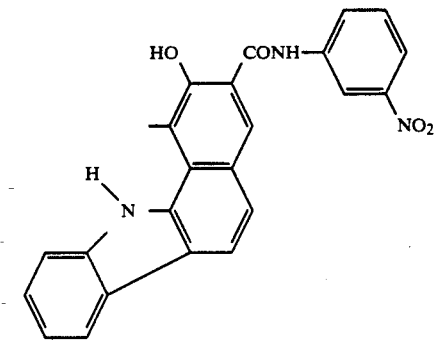 |
| II-28 | 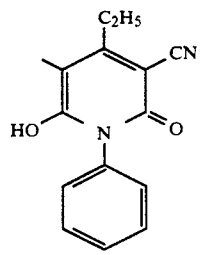 | II-29 | 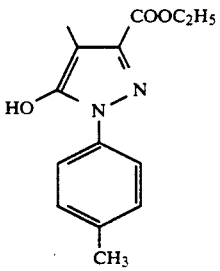 |

The third kind of the specific azo compounds to be used as a charge generating substance in the present invention is represented by the following general formula (III):

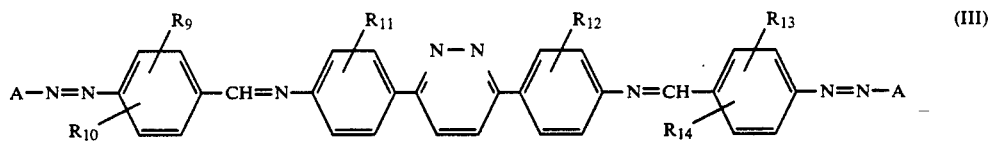

Wherein A is foregoing coupler residual group, each of $R_9$, $R_{10}$, $R_{13}$ and $R_{14}$ is selected from the group consisting of a hydrogen atom, a halogen atom, a nitro group, an alkyl group and an alkoxy group, the last two of which groups may be or not may be substituted, and each of $R_{11}$ and $R_{12}$ is selected from the group consisting of a hydrogen atom, a halogen atom, an alkyl group and an alkoxy group, each of which groups may be or not may be substituted.

Azo compounds, represented by the foregoing general formula (III) can be synthesized by diazotizing a compound represented by the following general formula (3) with a conventional method and coupling reacting the resultant azo compound with a corresponding coupler in an appropriate solvent (for example, N,N-dimethylformamide, dimethyl sulfoxide and so on) under the presence of a base and further condensing reacting the obtained compound with an amino compound represented by the following general formula (4) in the above mentioned solvent:

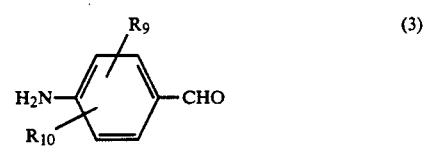

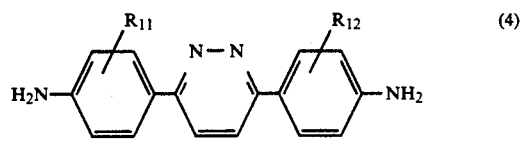

$R_9$ to $R_{12}$ were explained before.

Specific examples of the azo compounds of the general formula (III) prepared in the above-mentioned manner include compounds as shown in Table H.

TABLE H
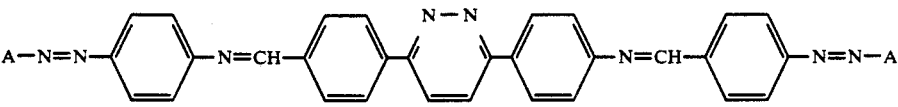
| COMPOUND No. | A | COMPOUND No. | A |
|---|---|---|---|
| III-1 | 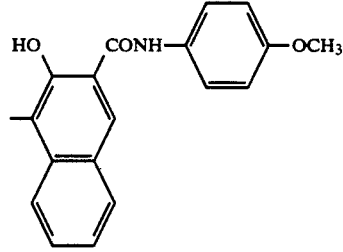 | III-2 | 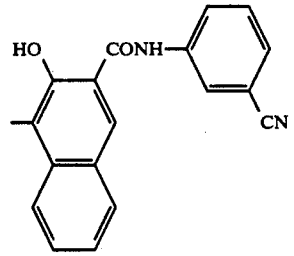 |
| III-3 | 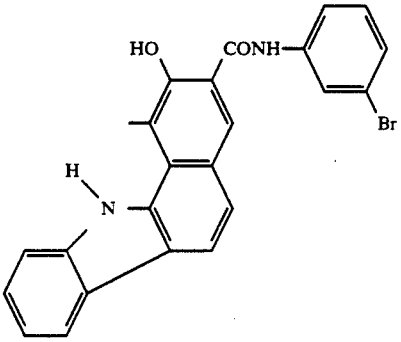 | III-4 | 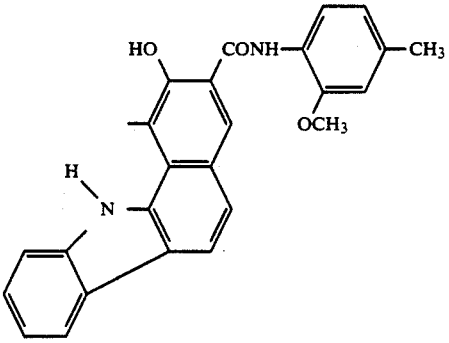 |
| III-5 | 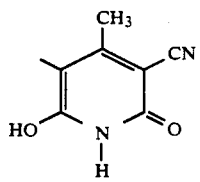 | III-6 | 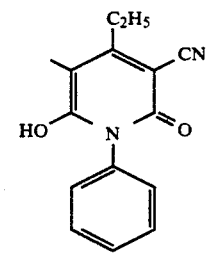 |
| III-7 | 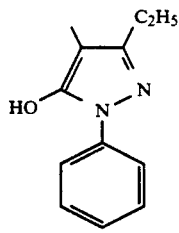 | III-8 | 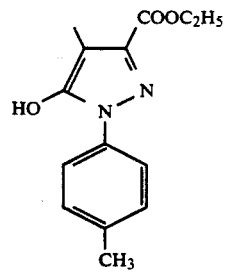 |
| III-9 | 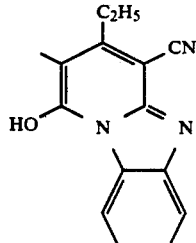 | III-10 | 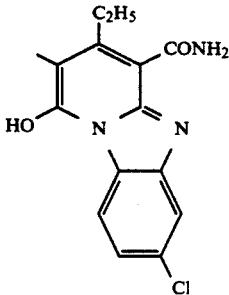 |

The fourth kind of the specific azo compounds to be used as a charge generating substance in the present invention is represented by the following general formula (IV):

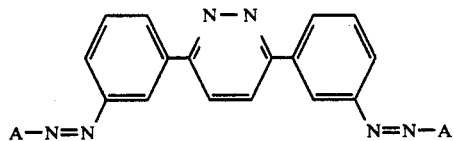

(IV)

wherein A is a foregoing coupler residual group.

Azo compounds, represented by the foregoing general formula (IV) can be synthesized by diazotizing an amino compound represented by the following general formula (5) with a conventional method and coupling reacting the resultant azo compound with a corresponding coupler in an appropriate solvent (for example, N,N-dimethylformamide, dimethyl sulfoxide and so on) under the presence of a base.

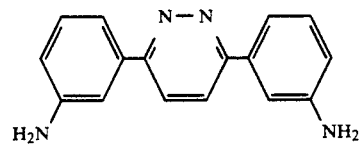

(5)

Specific examples of the azo compounds of the general formula (IV) prepared in the above-mentioned manner include compounds as shown in Table I.

TABLE I

| COMPOUND No. | A |
|---|---|
| IV-1 | pyridone with CH$_3$, NC, =O, OH, N-C$_3$H$_7$ |
| IV-2 | pyridone with C$_2$H$_5$, NC, =O, OH, N-phenyl |
| IV-3 | pyridone with CH$_3$, NC, =O, OH, N-(4-chlorophenyl) |
| IV-4 | pyridine with CH$_3$, NC, =N-, OH, N-(2-phenyl)phenyl |
| IV-5 | pyridine with C$_2$H$_5$, NC, =N-, OH, N-(2-phenyl)phenyl |
| IV-6 | pyridine with CH$_3$, H$_2$NC(=O), =N-, OH, N-(2-phenyl)phenyl |
| IV-7 | pyrazole with CH$_3$, OH, N-phenyl |

TABLE I-continued

[Structural diagram: two phenyl groups connected via N=N and CH=CH bridge, with A—N=N substituents]

| COMPOUND No. | A |
|---|---|
| IV-8 | 3-hydroxy-4-methyl-naphthalene-2-carboxamide with 3-nitrophenyl group (HO-N=C, O₂N substituent) |
| IV-9 | 1-butyl-3-cyano-4-ethyl-5-methyl-6-hydroxy-2-pyridone (C₂H₅, CN, OH, C₄H₉, =O) |
| IV-10 | benzimidazole fused with naphthalene carbonyl (OH, CH₃ substituents) OR isomeric form |
| IV-11 | 3-hydroxy-4-methyl-naphthalene-2-carboxamide with 3-bromophenyl (HO-N=C, Br) |
| IV-12 | 3-hydroxy-4-methyl-naphthalene-2-carboxamide with 3-methylphenyl (HO-N=C, CH₃) |

TABLE I-continued

[Structural diagram: cis isomer of above structure]

| COMPOUND No. | A |
|---|---|
| IV-13 | 3-hydroxy-4-methyl-naphthalene-2-carboxamide with phenyl group (HO-N=C) |
| IV-14 | 3-hydroxy-4-methyl-naphthalene-2-carboxamide with 3-methoxyphenyl (HO-N=C, CH₃O) |
| IV-15 | 3-hydroxy-4-methyl-naphthalene-2-carboxamide with 1-naphthyl (HO-N=C) |
| IV-16 | phenyl-substituted hydroxynaphthalene carboxamide with fused NH-carbazole-like ring system |

TABLE I-continued

[Structure: bis-azo compound with N=N bridge, A-N=N groups on both sides]

| COMPOUND No. | A |
|---|---|
| IV-17 | [Structure: fluorene with HO, NC-NH-phenyl, OH groups] |
| IV-18 | [Structure: naphthalimide with CH₃-N, OH] |
| IV-19 | [Structure: naphthalimide with phenyl-N, OH] |
| IV-20 | [Structure: pyrazolone with CH₃, OH, p-tolyl] |
| IV-21 | [Structure: pyrazolone with C₂H₅OOC, CH₃, OH, phenyl] |
| IV-22 | [Structure: pyridone with CH₃, NC, OH, C=O, NH] |

The fifth kind of the specific azo compounds to be used as a charge generating substance in the present invention is represented by the following general formula (V):

$$A-N=N-\text{[phenyl]}-C(=N-N=C)-\text{[phenyl]}-N=N-A \quad (V)$$

with S-containing bridge wherein A is one of the foregoing coupler residual group.

Azo compounds, represented by the foregoing general formula (V) can be synthesized by diazotizing an amino compound represented by the following general formula (6) with a conventional method and coupling reacting the resultant azo compound with a corresponding coupler in an appropriate solvent (for example, N,N-dimethylformamide, dimethyl sulfoxide and so on) under the presence of a base.

$$H_2N-\text{[phenyl]}-C(=N-N=C)-\text{[phenyl]}-NH_2 \quad (6)$$

with S-containing bridge

Specific examples of the azo compounds of the general formula (V) prepared in the above-mentioned manner include compounds as shown in Table J.

TABLE J
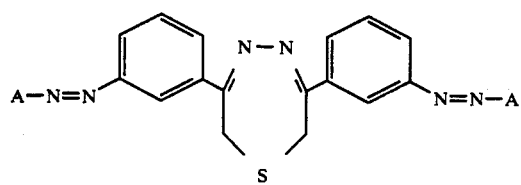
| COMPOUND No. | A |
|---|---|
| V-1 | 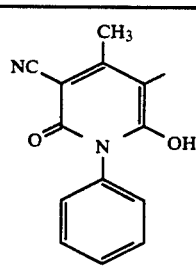 |
| V-2 | 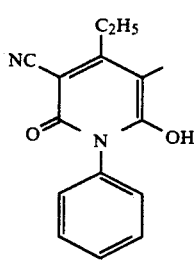 |
| V-3 | 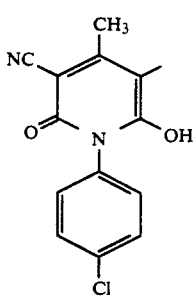 |
| V-4 | 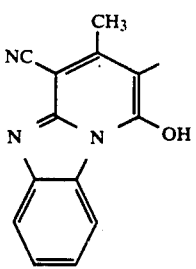 |
| V-5 | 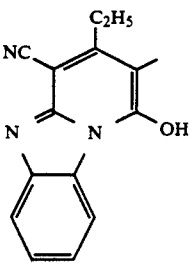 |
TABLE J-continued
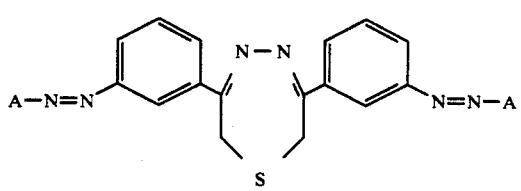
| COMPOUND No. | A |
|---|---|
| V-6 | 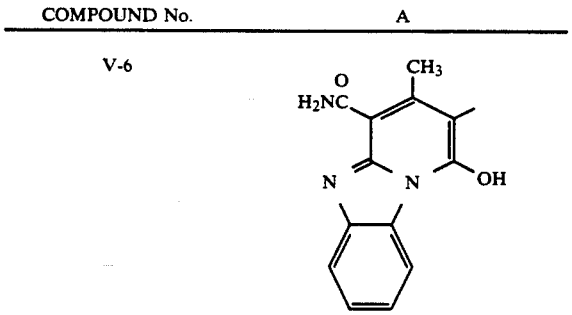 |
| V-7 | 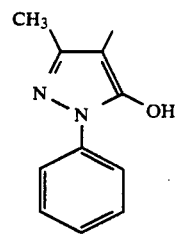 |
| V-8 | 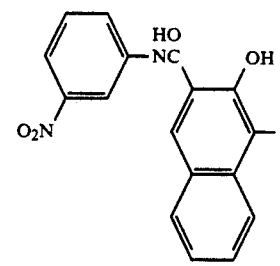 |
| V-9 |  |
| V-10 | 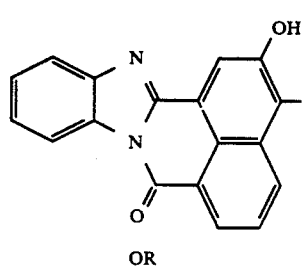 |

TABLE J-continued

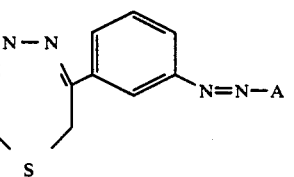

COMPOUND No. A

As for the use of the azo compounds represented by the general formulae given above in photosensitive layers, there has been no precedent before. In the course of the intensive study of various organic materials as made in an attempt to achieve the above object, the present inventors conducted a number of experiments with those azo compounds and, as a result, found that the use of such specific azo compounds represented by the above general formulae (I) to (V) as charge generating substances is very effective in improving electrophotographic characteristics. Based on this finding, photoconductors having high sensitivity and good repeated use characteristics are obtained.

Examples will now be given, wherein various compounds represented by the general formulae (I) to (V) were respectively used to produce photoconductors.

EXAMPLE 1

50 parts by weight of the compound No. I-1, 100 parts by weight of a polyester resin (Vylon 200, manufactured by Toyobo Co., Ltd.) and 100 parts by weight of 1-phenyl-3-(p-diethylaminostyryl)-5-(p-diethylaminophenyl)-2-pyrazoline (ASPP) are kneaded with tetrahydrofuran (THF) as a solvent with a mixer for 3 hours to prepare a coating liquid. The coating liquid was applied onto an aluminum-deposited polyester film (Al-PET) as an electroconductive substrate by means of the wire bar technique to form a photosensitive layer having a dry thickness of 15 μm. Thus, a photoconductor with the structure shown in FIG. 1 was produced.

EXAMPLE 2

First, 100 parts by weiht of p-diethylaminobenzaldehyde-diphenylhydrazone (ABPH) and 100 parts by weight of polycarbonate resin (Panlite L-1250 manufactured by Teijin Chemicals Co., Ltd.) were solved in methylene chloride to prepare a coating liquid. The coating liquid was applied onto an aluminum-deposited polyester film substrate by the wire bar technique to form a charge transporting layer having a dry thickness of 15 μm. 50 parts by weight of the compound No. I-2 and 50 parts by weight of a polyester resin (Vylon 200) were kneaded with a mixer for 3 hours together with THF as a solvent to prepare a coating liquid, which was then applied onto the charge transporting layer by the wire bar technique to form a charge generating layer having a dry thickness of 0.5 μm. And further, a covering layer was formed on the charge generating layer. Thus, a photoconductor with a structure corresponding to that shown in FIG. 3 was produced.

EXAMPLE 3

A charge transporting layer was formed in substantially the same manner as in Example 2 except that α-phenyl-4'-N,N-dimethylaminostilbene, which is a stilbene compound, was used to replace ABPH as a charge transporting substance. Then a charge generating layer was formed on the charge transporting layer and further, the covering layer was formed in the same manner as in Example 2, thus a photoconductor was produced.

EXAMPLE 4

A charge transporting layer was formed in substantially the same manner as in Example 2 except that tri(p-tolyl)amine, which is a triphenylamine compound, was used to replace ABPH as a charge transporting substance. Then a charge generating layer was formed on the charge transporting layer and and covering layer was formed in the same manner as in Example 2, thus a photoconductor was produced.

EXAMPLE 5

A charge transporting layer was formed in substantially the same manner as in Example 2 except that 2,5-bis(p-diethylaminophenyl)-1,3,4-oxadiazole, which is an oxadiazole compound, was used to replace ABPH as a charge transporting substance. Then a charge generating layer was formed on the charge transporting layer and the covering layer was formed in the same manner as in Example 2, thus a photoconductor was produced.

EXAMPLE 6

A photoconductor was produced in the same manner as in Example 1 except that compound No. II-1 was used to replace compound No. I-1 as a charge generating substance.

EXAMPLE 7

A photoconductor was produced in the same manner as in Example 2 except that compound No. II-2 was used to replace compound No. I-2 as a charge generating substance.

EXAMPLE 8

A photoconductor was produced in the same manner as in Example 7 except that α-phenyl-4'-N,N-dimethylaminostilbene, was used to replace ABPH as a charge transporting substance.

EXAMPLE 9

A photoconductor was produced in the same manner as in Example 7 except that tri(p-tolyl)amine was used to replace ABPH as a charge transporting substance.

EXAMPLE 10

A photoconductor was produced in the same manner as in Example 7 except that 2,5-bis(p-diethylaminophenyl)-1,3,4-oxadiazole was used to replace ABPH as a charge transporting substance.

EXAMPLE 11

A photoconductor was produced in the same manner as in Example 1 except that the compound No. IV-1 was used to replace compound No. I-1 as a charge generating substance.

EXAMPLE 12

A photoconductor was produced in the same manner as in Example 2 except that compound No. IV-2 was used to replace compound No. I-2 as a charge generating substance.

EXAMPLE 13

A photoconductor was produced in the same manner as in Example 12 except that tri(p-tolyl)amine was used to replaced ABPH as a charge transporting substance.

EXAMPLE 14

100 parts by weight of compound No. IV-3 and 100 parts by weight of a polyester resin (Vylon 200) were kneaded with MEK as a solvent with a mixer for 3 hours to prepare a coating liquid. The respective coating liquids were applied onto aluminum substrates to form a charge generating layer having a dry thickness of about 0.5 μm. Further, the coating liquid was prepared by solving 100 parts by weight of α-phenyl-4'-N,N-dimethylaminostilbene and 100 parts by weight of polycargbonate resine (Panlite L-1250) into methylene chloride. The coating liquid was applied onto the charge generating layer to form a charge transporting layer. Thus, a photoconductors as shown in FIG. 2 was produced.

EXAMPLE 15

A photoconductor was produced in the same manner as in Example 14 except that 2,5-bis(p-diethylaminophenyl)-1,3,4-oxadiazole was used as a charge transporting substance.

The electrophotographic characteristics of the photoconductors thus produced were measured by utilizing an electrostatic recording paper testing apparatus (Kawaguchi Denki Model SP-428). The result obtained as shown in Table 1.

The surface potential $V_s$ (volts) of each photoconductor is an initial surface potential which was measured when the surface of the photoconductor was charged in the dark by corona discharge at +6.0 kV or −6.0 kV for 10 seconds. The surface of the respective photoconductors was positively charged in Example 1-13, while negatively charged in Examples 14 and 15. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, then from which the half decay exposure amount $E_{\frac{1}{2}}$ (lux·sec) was calculated. Also, the surface potential $E_{\frac{1}{2}}$ of the photoconductor after 10 seconds of irradiation thereof with white light at an illuminance of 2 luxes was measured as residual potential $V_r$ (volts).

TABLE 1

|  | $V_s$ (volt) | $V_r$ (volt) | $E_{\frac{1}{2}}$ (lux·sec) |
|---|---|---|---|
| Example 1 | 650 | 80 | 5.0 |
| Example 2 | 600 | 100 | 4.8 |
| Example 3 | 620 | 115 | 5.3 |
| Example 4 | 630 | 95 | 5.5 |
| Example 5 | 670 | 80 | 4.9 |
| Example 6 | 650 | 50 | 3.5 |
| Example 7 | 670 | 20 | 3.0 |
| Example 8 | 700 | 60 | 3.7 |
| Example 9 | 690 | 40 | 4.0 |
| Example 10 | 630 | 50 | 3.8 |
| Example 11 | 630 | 100 | 5.1 |
| Example 12 | 640 | 50 | 3.2 |
| Example 13 | 700 | 60 | 4.1 |
| Example 14 | −620 | −50 | 3.0 |
| Example 15 | −660 | −80 | 3.6 |

As can be seen in Table 1, the photoconductors of Examples 1 to 15 have good characteristics in the half decay exposure amounts $E_{\frac{1}{2}}$ and the residual potential $V_r$.

EXAMPLE 6

100 parts by weight of each of respective azo compounds Nos. from I-3 to I-33, from II-3 to I-29, from III-1 to III-10, from IV-4 to IV-22 and from V-1 to V-10 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer to form a charge transporting layer having a thickness of about 15 μm, thus photoconductors as shown in FIG. 2 were produced.

The electrophotographic characteristics of the photoconductors thus produced were measured in the same manner as in Examples 14 and 15 by utilizing an electrostatic recording paper testing apparatus SP-428. The results of the measurements are shown in Table 2.

TABLE 2

| Compound No. | $E_{\frac{1}{2}}$ (lux·sec) |
|---|---|
| I-3 | 4.8 |
| I-4 | 4.3 |
| I-5 | 3.9 |
| I-6 | 4.7 |
| I-7 | 5.0 |
| I-8 | 3.8 |
| I-9 | 4.2 |
| I-10 | 5.4 |
| I-11 | 4.1 |
| I-12 | 4.1 |
| I-13 | 3.8 |
| I-14 | 4.1 |
| I-15 | 4.8 |
| I-16 | 4.5 |
| I-17 | 4.7 |
| I-18 | 5.5 |
| I-19 | 5.4 |
| I-20 | 5.1 |
| I-21 | 5.9 |
| I-22 | 4.8 |
| I-23 | 5.3 |
| I-24 | 4.0 |
| I-25 | 5.8 |
| I-26 | 5.2 |
| I-27 | 5.1 |
| I-28 | 6.0 |
| I-29 | 4.5 |

TABLE 2-continued

| Compound No. | $E_{\frac{1}{2}}$ (lux · sec) |
|---|---|
| I-30 | 4.3 |
| I-31 | 5.1 |
| I-32 | 4.7 |
| I-33 | 5.5 |
| II-3 | 3.2 |
| II-4 | 3.8 |
| II-5 | 3.5 |
| II-6 | 4.2 |
| II-7 | 4.0 |
| II-8 | 3.7 |
| II-9 | 4.1 |
| II-10 | 3.6 |
| II-11 | 3.9 |
| II-12 | 4.2 |
| II-13 | 3.8 |
| II-14 | 4.0 |
| II-15 | 4.3 |
| II-16 | 4.4 |
| II-17 | 4.6 |
| II-18 | 4.0 |
| II-19 | 4.8 |
| II-20 | 4.3 |
| II-21 | 4.0 |
| II-22 | 3.9 |
| II-23 | 4.2 |
| II-24 | 5.0 |
| II-25 | 5.2 |
| II-26 | 4.1 |
| II-27 | 4.8 |
| II-28 | 4.3 |
| II-29 | 4.7 |
| III-1 | 4.8 |
| III-2 | 5.0 |
| III-3 | 4.3 |
| III-4 | 4.6 |
| III-5 | 5.0 |
| III-6 | 4.4 |
| III-7 | 5.3 |
| III-8 | 5.5 |
| III-9 | 5.2 |
| III-10 | 5.1 |
| IV-4 | 2.5 |
| IV-5 | 1.9 |
| IV-6 | 2.8 |
| IV-7 | 3.2 |
| IV-8 | 2.6 |
| IV-9 | 2.6 |
| IV-10 | 2.8 |
| IV-11 | 3.5 |
| IV-12 | 3.1 |
| IV-13 | 2.9 |
| IV-14 | 2.8 |
| IV-15 | 2.1 |
| IV-16 | 3.5 |
| IV-17 | 2.4 |
| IV-18 | 1.8 |
| IV-19 | 1.9 |
| IV-20 | 2.2 |
| IV-21 | 2.8 |
| IV-22 | 3.1 |
| V-1 | 3.0 |
| V-2 | 3.9 |
| V-3 | 3.3 |
| V-4 | 2.8 |
| V-5 | 2.9 |
| V-6 | 2.2 |
| V-7 | 3.6 |
| V-8 | 2.6 |
| V-9 | 1.8 |
| V-10 | 2.3 |

As can be seen in Table 2, the photoconductors using the azo compound No. I-3 to No. I-33, No. II-3 to No. II-29, No. III-1 to No. III-10, No. IV-4 to No. IV-22 and No. V-1 to No. V-10 as a charge generating substance have good characteristics in the hald decay exposure amounts $E_{\frac{1}{2}}$.

As described above, according to the present invention, since an azo compound represented by any one of the aforementioned chemical formulae (I) to (V) is used as a charge generating substance in a photosensitive layer formed on an electroconductive substrate, a photoconductor shows a high sensitive and excellent characteristics in repeated use when adapted to either a positive charge mode or a negative charge mode. If necessary, a covering layer may be provided on the surface of a photoconductor to improve the durability thereof.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A photoconductor for electrophotography, comprising:
   an electroconductive substrate; and
   a photosensitive layer formed on said substrate and including a charge generating substance comprised of at least one azo compound represented by general formulae (I) and (IV):

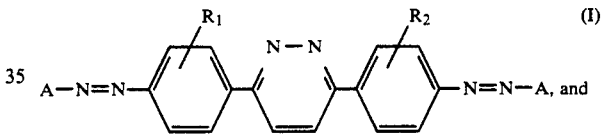

(I)

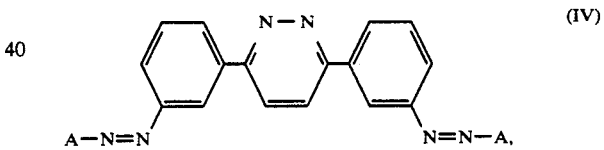

(IV)

wherein A in formulae (I) and (IV) is a coupler residual group represented by one of general formulae (VII) to (IX),

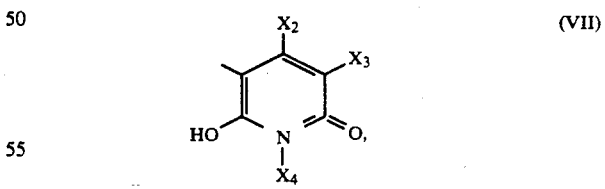

(VII)

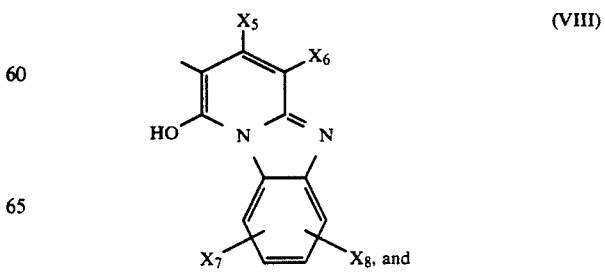

(VIII)

-continued (IX)

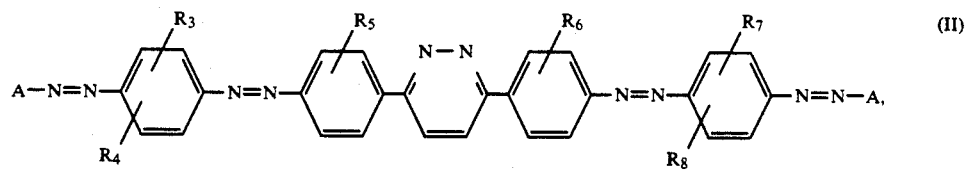

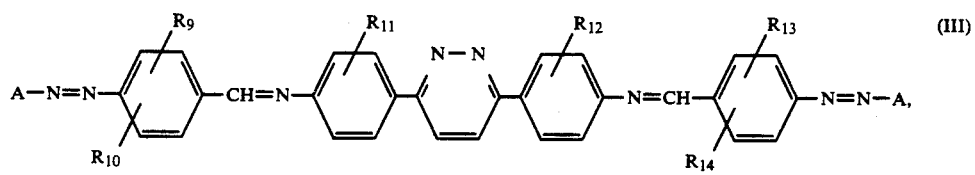

and

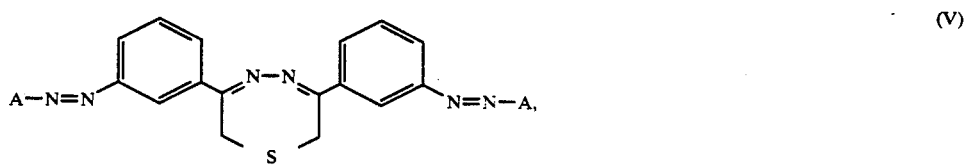

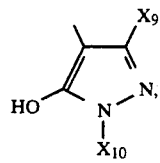

each of $R_1$ and $R_2$ in formula (I) is selected from the group consisting of a hydrogen atom, a halogen atom, an alkyl group and an alkoxy group, each of which groups may be substituted, each of $X_2$ and $X_5$ is selected from the group consisting of an alkyl group and an aryl group, each of which groups may be substituted, each of $X_3$ and $X_6$ is selected from the group consisting of a hydrogen atom, a cyano group, a carbamoyl group, a carboxyl group, an ester group and an acyl group, each of which groups may be substituted, $X_4$ is selected from the group consisting of a hydrogen atom, an alkyl group, a cycloalkyl group, an alkenyl group, an aralkyl group, an aryl group and a heterocyclic group, each of which groups may be substituted, each of $X_7$ and $X_8$ is selected from the group consisting of a hydrogen atom, a halogen atom, a nitro group and the following groups which may be substituted, an alkyl group and an alkoxy group, $X_9$ is selected from the group consisting of an alkyl group, an aryl group, a carboxyl group and an ester group, each of which groups may be substituted, and $X_{10}$ is one of an aryl group and a heterocyclic group, each of which groups may be substituted.

2. The photoconductor as claimed in claim 1, wherein said photosensitive layer comprises a layer including a dispersion of the charge generating substance and a charge transporting substance in a binder.

3. The photoconductor as claimed in claim 1, wherein said photosensitive layer comprises a laminated of a charge transporting layer comprising a charge transporting substance in a binder, a charge generating layer comprising the charge generating substance in a binder.

4. A photoconductor for electrophotography, comprising:
    an electroconductive substrate; and
    a photosensitive layer formed on said substrate and including a charge generating substance comprised of at least one azo compound represented by general formulae (II), (III) and (V):

wherein A in formulae (II), (III) and (V) is a coupler residual group, each of $R_5$ and $R_6$ in formula (II) and each of $R_{11}$ and $R_{12}$ in formula (III) is selected from the group consisting of a hydrogen atom, a halogen atom, an alkyl group and an alkoxy group, each of which groups may be substituted, each of $R_3$, $R_4$, $R_7$ and $R_8$ in formula (II) and each of $R_9$, $R_{10}$, $R_{13}$ and $R_{14}$ in formula (III) is selected from the group consisting of a hydrogen atom, a halogen atom, a nitro group and the following groups which may be substituted, an alkyl group and an alkoxy group.

5. The photoconductor as claimed in claim 4, wherein said coupler residual group A is selected from the group consisting of structures represented by one of general formulae (VI) to (XII):

(VI)

HO  $X_1$ (VII)

Z  $X_2$  $X_3$
HO  N  O,
     $X_4$

-continued

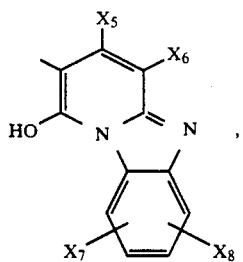 (VIII)

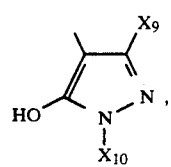 (IX)

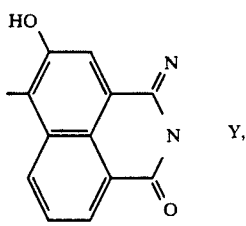 (X)

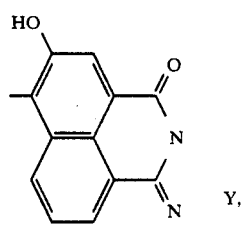 (XI)

and

-continued

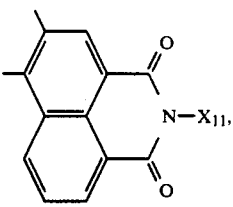 (XII)

wherein Z is a residual group which condenses with a benzene ring to form an aromatic polycycle or heterocycle, $X_1$ is selected from the group consisting of a hydrogen atom, $COOR_{15}$ and $CONR_{16}R_{17}$, each of $R_{15}$, $R_{16}$ and $R_{17}$ being selected from the group consisting of a hydrogen atom, an alkyl group, an aryl group and a heterocyclic group, each of which groups may be substituted, each of $X_2$ and $X_5$ is selected from the group consisting of an alkyl group, an aryl group and a heterocyclic group, each of which group may be substituted, each of $X_3$ and $X_6$ is selected from the group consisting of a hydrogen atom, a cyano group, a carbamoyl group, a carboxyl group, an ester group and an acyl group, each of which groups may be substituted, each of $X_4$ and $X_{11}$ is selected from the group consisting of a hydrogen atom, an alkyl group, a cycloalkyl group, an alkenyl group, an aralkyl group, an aryl group and a heterocyclic group, each of which groups may be substituted, each of $X_7$ and $X_8$ is selected from the group consisting of a hydrogen atom, a halogen atom, a nitro group and the following groups which may be substituted, an alkyl group and an alkoxy group, $X_9$ is selected from the group consisting of an alkyl group, an aryl group, a carboxyl group and an ester group, each of which groups may be substituted, $X_{10}$ is one of an aryl group and a heterocyclic group, each of which groups may be substituted, and Y is a residual group which forms a heterocyclic group.

6. The photoconductor as claimed in claim 4, wherein said photosensitive layer comprises a layer including a dispersion of the charge generating substance and a charge transporting substance in a binder.

7. The photoconductor as claimed in claim 4, wherein said photosensitive layer comprises a laminate of a charge transporting layer comprising a charge transporting substance in a binder and a charge generating layer comprising the charge generating substance in a binder.

* * * * *